(12) United States Patent
Trachtenberg et al.

(10) Patent No.: US 10,832,597 B2
(45) Date of Patent: Nov. 10, 2020

(54) MULTIPLE DISPLAY DEVICE INSTALLATION

(71) Applicants: Marc Trachtenberg, New York, NY (US); Benjamin Trachtenberg, New York, NY (US); Francois Gariepy, Westmount (CA)

(72) Inventors: Marc Trachtenberg, New York, NY (US); Benjamin Trachtenberg, New York, NY (US); Francois Gariepy, Westmount (CA)

(73) Assignee: Videri Inc., New York, NY (US)

( * ) Notice: Subject to any disclaimer, the term of this patent is extended or adjusted under 35 U.S.C. 154(b) by 0 days.

(21) Appl. No.: 16/229,326

(22) Filed: Dec. 21, 2018

(65) Prior Publication Data
US 2019/0279540 A1    Sep. 12, 2019

Related U.S. Application Data

(60) Provisional application No. 62/609,453, filed on Dec. 22, 2017.

(51) Int. Cl.
*G09F 9/302*   (2006.01)
*G06F 3/14*    (2006.01)
*G09G 5/12*    (2006.01)

(52) U.S. Cl.
CPC .......... *G09F 9/3026* (2013.01); *G06F 3/1423* (2013.01); *G09G 5/12* (2013.01);
(Continued)

(58) Field of Classification Search
CPC ..................................................... G09F 9/3026
(Continued)

(56) References Cited

U.S. PATENT DOCUMENTS

2006/0000634 A1    1/2006  Arakawa
2007/0000849 A1*   1/2007  Lutz .......................... G09F 9/33
                                                              211/26
(Continued)

OTHER PUBLICATIONS

Written Opinion of the International Searching Authority in PCT/US2018/067071 (dated May 31, 2019).
(Continued)

*Primary Examiner* — Long D Pham
(74) *Attorney, Agent, or Firm* — Pryor Cashman LLP

(57) ABSTRACT

An installation and associated method, including multiple digital display devices, each digital display device including a display screen, a memory, and a processor; a hanging system configured to physically and electrically connect to the multiple digital display devices, the hanging system including a bar and hanging wires extending from the bar to each digital display device of the multiple digital display devices; a power adapter connected to the hanging system and configured to convert power received from a power source to direct current power and distribute the direct current power to each digital display device of the multiple digital display devices through the hanging wires; and a master data modem and multiplexing module connected to the hanging system and configured to embed an external data signal into the direct current power and distribute data to each digital display device of the multiple digital display devices through the hanging wires.

20 Claims, 5 Drawing Sheets

(52) U.S. Cl.
CPC ... *G09G 2330/00* (2013.01); *G09G 2370/025* (2013.01); *G09G 2370/16* (2013.01); *G09G 2380/16* (2013.01)

(58) Field of Classification Search
USPC .......................................................... 345/1.1
See application file for complete search history.

(56) References Cited

U.S. PATENT DOCUMENTS

| | | | |
|---|---|---|---|
| 2007/0279314 A1* | 12/2007 | Brown ..................... | G09F 9/33 345/1.1 |
| 2008/0024387 A1* | 1/2008 | Maskeny ................ | G09G 3/32 345/1.1 |
| 2010/0037533 A1 | 2/2010 | Anderson | |
| 2010/0263802 A1* | 10/2010 | Juan ....................... | E04B 2/827 160/120 |
| 2011/0309041 A1 | 12/2011 | Amadio et al. | |
| 2014/0340330 A1* | 11/2014 | Trachtenberg ........ | G06F 1/1626 345/173 |
| 2015/0187333 A1 | 7/2015 | Loeffler et al. | |
| 2015/0246623 A1* | 9/2015 | Peruzzotti ............. | D07B 1/147 191/41 |
| 2016/0132281 A1* | 5/2016 | Yamazaki ............ | G06F 3/1446 345/1.3 |
| 2017/0262245 A1 | 9/2017 | Yoganandan et al. | |

OTHER PUBLICATIONS

International Search Report in PCT/US2018/067071 (dated May 31, 2019).

* cited by examiner

MULTIPLE DISPLAY DEVICE INSTALLATION

CROSS-REFERENCE TO RELATED APPLICATIONS

The present application claims priority to U.S. provisional application Ser. No. 62/609,453, filed Dec. 22, 2017, the disclosure of which is incorporated herein by reference in its entirety.

TECHNICAL FIELD

The present invention relates to an installation for multiple display devices. More particularly, the present invention relates to an installation in which multiple display devices are suspended from a bar through a wiring arrangement.

BACKGROUND OF THE INVENTION

Artwork is commonly displayed in a salon-style hanging format in which several pictures are arranged together closely and in a relatively limited space. Recently, digital displays have been developed to provide for more creativity and flexibility than traditional artwork, including by spreading images across several displays, displaying videos, integrating animation and transitions, and displaying application-driven visual content on a single display device or across several display devices. While digital displays are becoming a medium of choice for displaying visual content, the use of separate stand-alone display devices to achieve a desired appearance may be challenging. Moreover, drawbacks of digital displays relate to the availability of smaller format display devices, mechanical installation of several display devices in close proximity, and power and data distribution across several display devices. Therefore, there is a need for an efficient mechanism by which several digital displays may be presented and arranged.

SUMMARY OF THE INVENTION

In general, in one aspect, the invention features a multiple digital display device installation, including multiple digital display devices, each digital display device including a display screen, a memory, and a processor; a hanging system configured to physically and electrically connect to the multiple digital display devices, the hanging system including a bar and hanging wires extending from the bar to each digital display device of the multiple digital display devices; a power adapter connected to the hanging system and configured to convert power received from a power source to direct current power and distribute the direct current power to each digital display device of the multiple digital display devices through the hanging wires; and a master data modem and multiplexing module connected to the hanging system and configured to embed an external data signal into the direct current power and distribute data to each digital display device of the multiple digital display devices through the hanging wires.

Implementations of the invention may include one or more of the following features. The installation may further include a local access server connected to at least the master data modem and multiplexing module. Each digital display device of the multiple digital display devices may further include a client data modem and multiplexing module configured to communicate with an external data source through the master data modem and multiplexing module. Each digital display device of the multiple digital display devices may have a thickness of less than 13 mm. The bar may be an H-beam. Each hanging wire of the hanging wires may include a protective covering and a conducting core, where the protective covering may include translucent silicon and the conducting core may include threaded copper or aluminum. Each hanging wire of the hanging wires may have a thickness of less than 1 mm. The installation may further include multiple attachment mechanisms, where at least one attachment mechanism of the multiple attachment mechanisms may be configured to attach a hanging wire of the hanging wires to a digital display device of the multiple digital display devices. The at least one attachment mechanism may include a vampire tap and a cover cap configured to attach to the vampire tap.

In general, in another aspect, the invention features a method of installing multiple digital display devices, including providing multiple digital display devices, each digital display device including a display screen, a memory, and a processor; physically and electrically connecting a hanging system to the multiple digital display devices, the hanging system including a bar and hanging wires extending from the bar to each digital display device of the multiple digital display devices; connecting a power adapter to the hanging system, where the power adapter converts power received from a power source to direct current power and distributes the direct current power to each digital display device of the multiple digital display devices through the hanging wires; and connecting a master data modem and multiplexing module to the hanging system, where the master data modem and multiplexing module embeds an external data signal into the direct current power and distributes data to each digital display device of the multiple digital display devices through the hanging wires.

Implementations of the invention may include one or more of the following features. The method may further include connecting a local access server to at least the master data modem and multiplexing module. Each digital display device of the multiple digital display devices may further include a client data modem and multiplexing module configured to communicate with an external data source through the master data modem and multiplexing module. Each digital display device of the multiple digital display devices may have a thickness of less than 13 mm. The bar may be an H-beam. Each hanging wire of the hanging wires may include a protective covering and a conducting core, where the protective covering may include translucent silicon and the conducting core may include threaded copper or aluminum. Each hanging wire of the hanging wires may have a thickness of less than 1 mm. The method may further include providing multiple attachment mechanisms, where at least one attachment mechanism of the multiple attachment mechanisms attaches a hanging wire of the hanging wires to a digital display device of the multiple digital display devices. The at least one attachment mechanism may include a vampire tap and a cover cap configured to attach to the vampire tap.

DETAILED DESCRIPTION OF THE INVENTION

Figure 1:
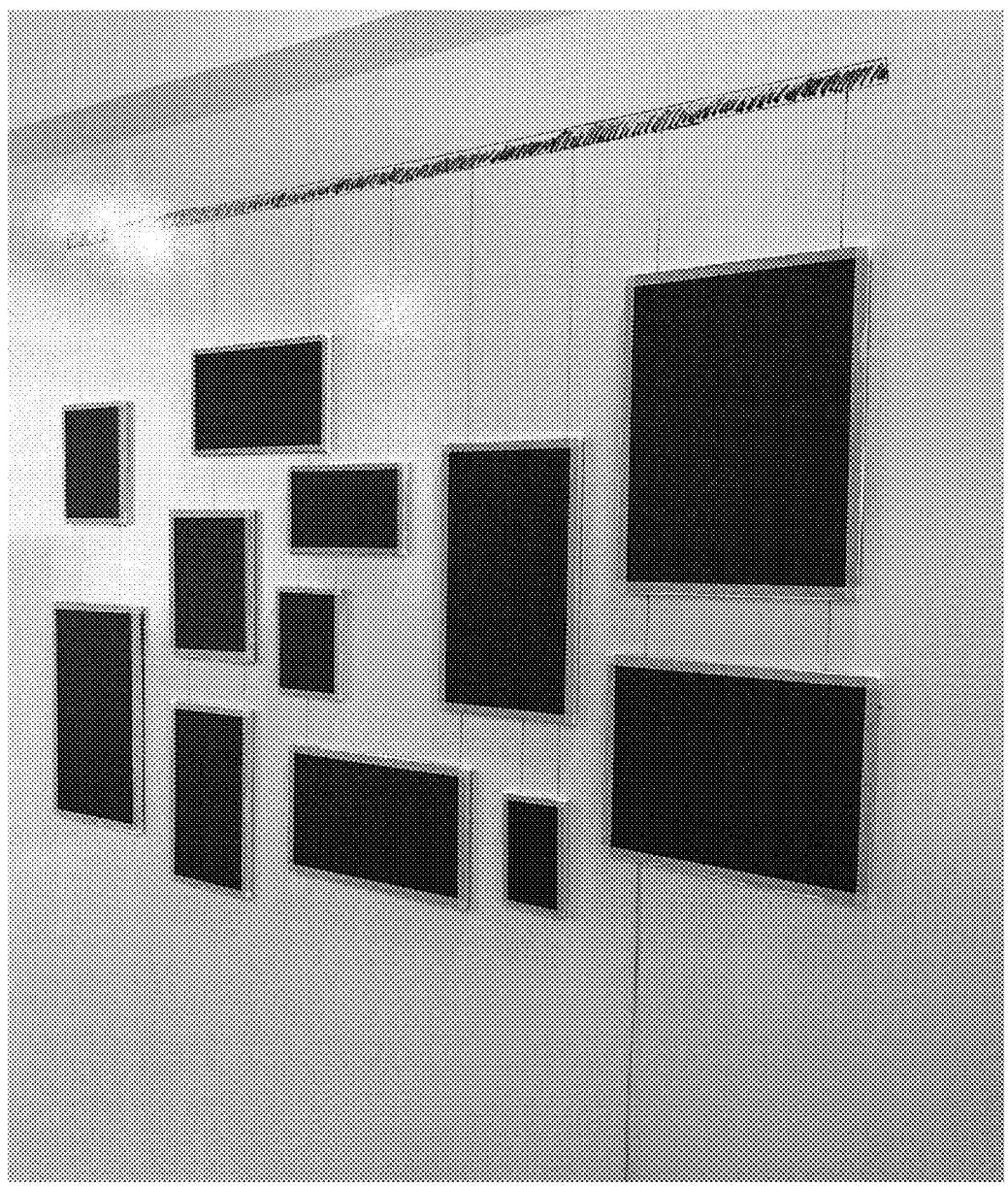
FIG. 1 illustrates a layout of a multiple display device installation of the present invention.
Figure 2:
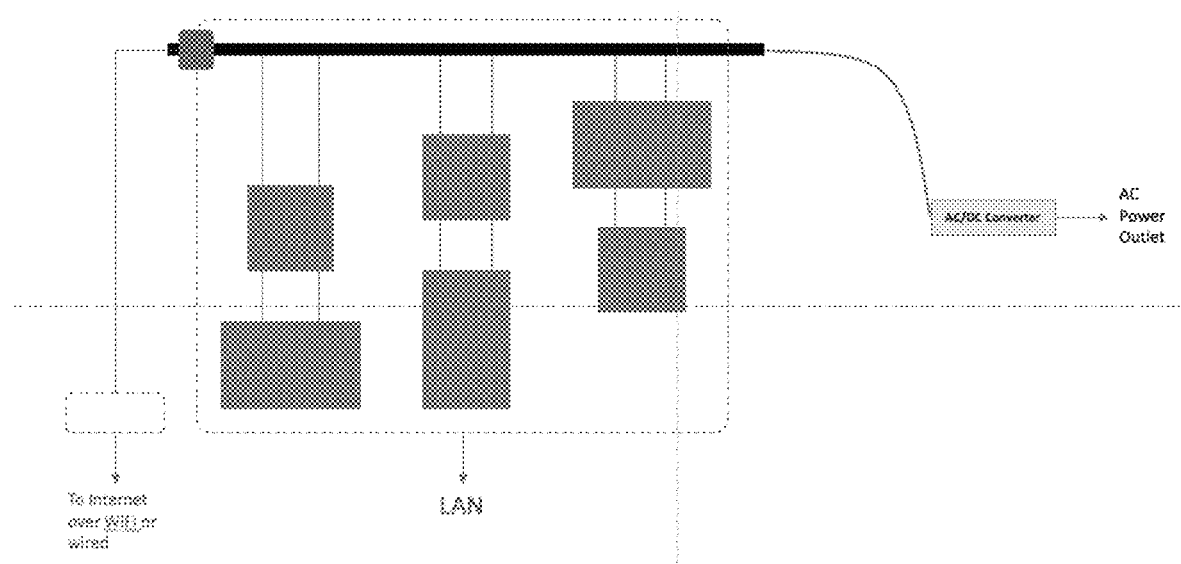
FIG. 2 illustrates a schematic diagram of a multiple display device installation of the present invention.

The present invention is directed to a multiple display device installation. The installation includes several components, namely a hanging system, multiple display devices, and a data link aspect. The multiple display device installation may optionally include a local access server. FIGS. 1-2 illustrate installations including a hanging system and multiple display devices. More specifically, FIG. 1 provides an installation including a hanging system having a main bar and hanging wires that are attached to the multiple display devices. FIG. 2 is also directed to such an installation, with the addition of an AC/DC converter element that connects the installation to an AC power source and an Internet connection element, either via a wired or wireless connection. Additionally, the multiple display devices of FIG. 2 are connected to each other over a proximity network, including but not limited to a local area network (LAN).

Hanging System

A hanging system of the present invention may serve to hold, power, and connect (e.g., for data distribution purposes) multiple display devices in a light, modular, and easily-installed structure. In one embodiment, the hanging system includes a main bar, hanging wires, a power adapter, and a master data modem and multiplexing module.

The main bar may be an H-beam, which may be installed horizontally at the top of a desired hang area. The main bar provides mechanical strength, stability, and support to hold the multiple display devices as well as power and data distribution support. The main bar may also be designed to be aesthetically pleasing and blend in with the surrounding décor of the hang area. The main bar may include one or more of the following elements:

1. Mounting features for wall anchoring, including but not limited to traditional hardware (e.g., screws and anchors) and double sided-tape;
2. A mechanism for holding the hanging wires firmly in place, allowing for horizontal adjustment, maintaining DC power polarity and stable data connection, and/or puncturing a protective covering of the hanging wire to create safe electrical contact for power distribution;
3. An AC/DC converter, such as for converting AC power received from a power grid into low DC power distributed via the hanging wires to the multiple display devices; and
4. The master data modem and multiplexing module, such as for embedding an external data signal (e.g., from an Ethernet) into DC power, including but not limited to the use of data over powerline technology.

In another embodiment, the main bar does not include the AC/DC converter and/or the master data modem and multiplexing module, but instead one or both of these elements are remotely located and connected to the main bar via wiring. Such a wiring arrangement may include thin conducting wires and may be routed through a wall or concealed by other décor elements. Thus, DC power may be provided by an AC/DC converter that is either embedded in or connected to the main bar. In either case, power is safely routed across the main bar and connected to each of the hanging wires to provide proper polarity. Additional AC/DC converters may be added or removed to adjust power capacity as needed. In another embodiment, power can be delivered using a data-power standard, such as USB-C, power over Ethernet technology, wireless power distribution, and the like.

The main bar preferably has a modular design, such that one or more extensions may be added to a base element incorporating core power and data components to adapt the installation to desired areas of differing widths.

Each of the hanging wires may include a conducting core, which may be composed of but not limited to threaded copper or aluminum, and a protective covering, which may be composed of but not limited to translucent silicon. The hanging wires may be any acceptable thickness, including 1 mm or less in diameter. The protective covering is provided to ensure safe handling and installation, maintain display device clamp holds, and permit display device clamps and the main bar holding mechanism to pierce the hanging wires to establish stable electrical contact with the internal conductor. In another embodiment, the hanging wires may include a tight composite of a structural ultra-thin wire with a number of conducting wires to deliver power and carry communication data to the multiple display devices.

A data link may be provided that utilizes data over powerline technology to create a local area network between the display devices and a standard external data connection, such as an Ethernet. This external data connection may be to the Internet, such as via a modem, or to an optional Local Access Server (LAS). The data over powerline technology may create a stable data network between the display devices through, but not limited to, the use of DC BUS or an equivalent protocol. This technology permits each display device to download media content from the Local Access Server or a service cloud, upload status information as necessary, and/or communicate with other display devices. Moreover, this technology permits each display device to be addressed individually and enables simultaneous data distribution to multiple display devices. The data link may be of low latency, low jitter, and/or low packet loss, such as to permit accurate time distribution to enable synchronization across multiple display devices. The data link is created using a single master data modem and multiplexing module to communicate with an external data source, such as the Internet, and a client data modem and multiplexing module embedded in each display device. In another embodiment, a standard data communication protocol, such as USB-C, may be utilized over conducting wires connected to each display device.

Display Devices

Each or one or more of the multiple display devices may be a digital display device having attributes that make the device uniquely suitable for displaying art, décor, pictures, photography, and/or other visual content and incorporating features to integrate seamlessly with other components of the installation.

The display device may be a digital display device based on technologies including LCD, LED, OLED, QLED, digital ink, graphene, and the like. Unique attributes of the display device may but do not necessarily include a slim device profile, narrow bezel, distinct hanging system, minimal or no wired connection, high color gamut, high resolution, uniform brightness, and/or an embedded processor running a high level operating system, such as LINUX, ANDROID, or WINDOWS.

More particularly, a display device selected for use in the installation of the present invention may range in size from hand-held devices to displays of over 60 inches. The characteristics of the display device may but do not necessarily include one or more of the following: an ultra-thin, e.g., preferably less than 13 mm, minimalistic design with a nearly invisible front bezel and border; an external power supply; ultra-thin or small diameter wiring between external power supply and display assembly; a built-in display processor with wireless connection to an Internet service cloud; an optional external decorative frame attachable to the device to replicate the aesthetics of a traditional painting; optional digital frames and/or digital matting rendered by an embedded graphics engine; and audio-over-WIFI, BLUETOOTH, Near Field Communication (NFC), or IBEACON, which are communication mechanisms to permit the display device to stream audio to an external audio system.

Figure 3:
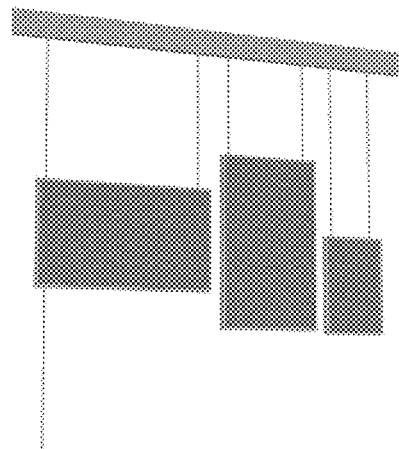
FIG. 3 illustrates an attachment mechanism for a display device in a multiple display device installation of the present invention.
Figure 3:
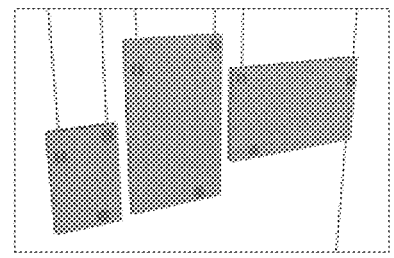
Figure 3:
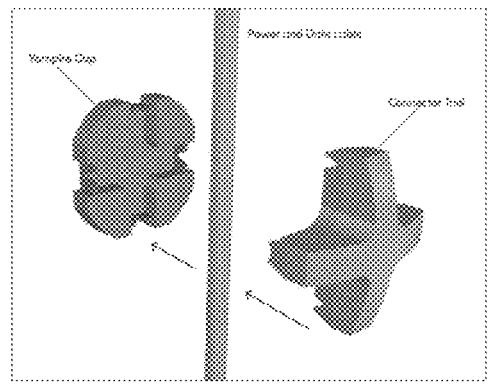
Figure 3:
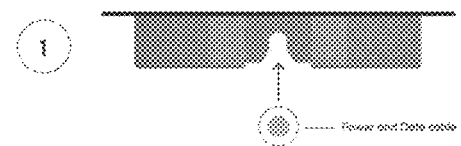
Figure 3:
Figure 3:
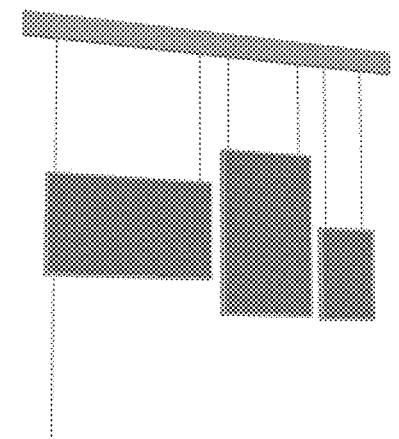
Figure 3:
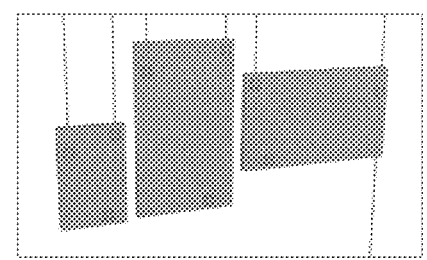
Figure 3:
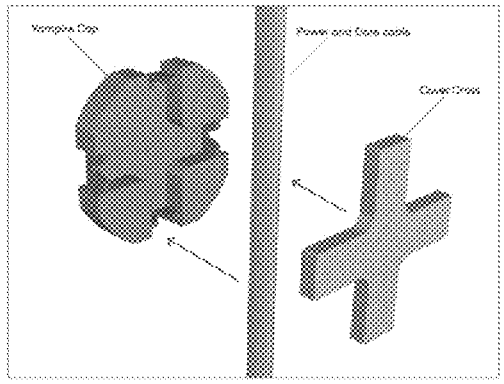
Figure 3:
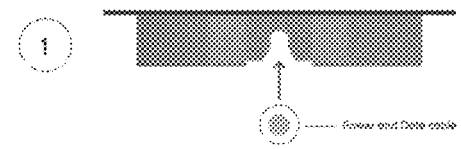
Figure 3:
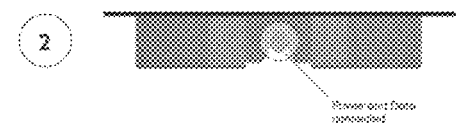

FIG. 3 illustrates attachment mechanisms for the display device, which are also referred to as display device clamps. These clamps may be provided on the back side of the display devices. The clamps may attach the display device to the hanging wires to lock the device in place. It is preferable that each display device include at least two clamps.

The components of the clamp and its mechanism for attaching to a hanging wire are illustrated in FIG. 3. The clamp may be a vampire tap that is attached to the back side of the display device. A connector tool may be utilized to force the hanging wire into a vampire tap. Once the hanging wire is inserted into the vampire tap, a cover cap may be snapped over the vampire tap and hanging wire, thereby locking the hanging wire in place. In order to increase arrangement flexibility and accommodate display devices of various sizes, the hanging wires may be aligned at different locations on the top and bottom of the display devices. It is preferable that the clamps include a mechanism for horizontal movement to a desired location on the display device. Moreover, it is preferable that the back side of the display device include routing channels to facilitate routing of the hanging wires to different horizontally-spaced locations on the top and bottom of the display device. A termination cap compatible with the end of a wire may be provided to terminate hanging wires behind a display device.

Figure 4:
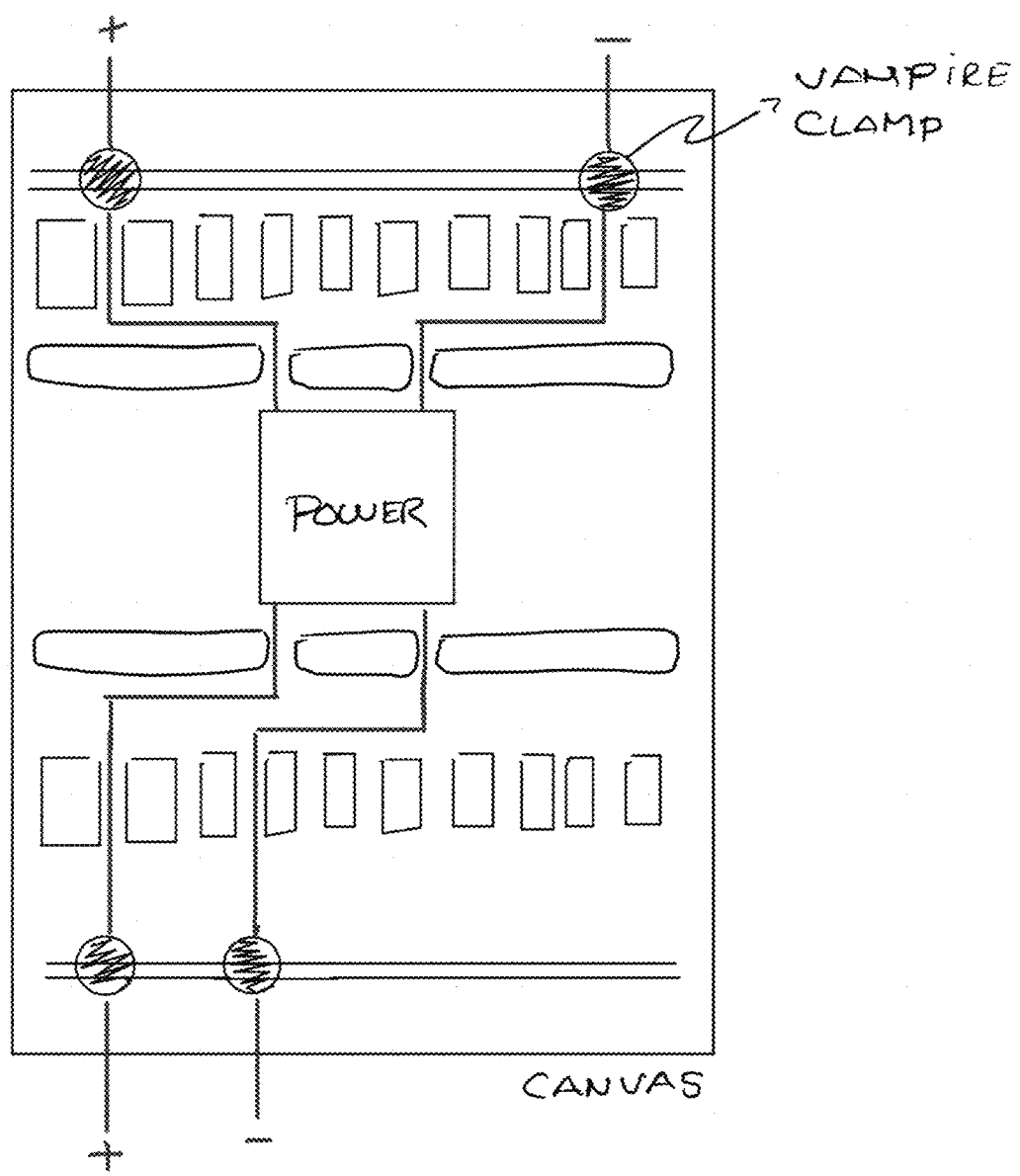
FIG. 4 illustrates a schematic diagram relating to power distribution of a display device in a multiple display device installation of the present invention.

As previously discussed, the multiple display devices may be powered by low voltage DC power, e.g., from 12 VDC to 50 VDC, carried over the hanging wires. Each display device is attached to at least two hanging wires of different polarity. Each display device clamp includes a small metal blade that punctures the protective covering of the hanging wire to a pre-determined depth to create an electrical connection. The current may be routed to a power distribution module that converts the current to a proper voltage and then distributes the current to various active components of the display device, such as the main board, back lighting, etc. The horizontal alignment mechanism of the clamps and the back side routing channels ensure proper polarity of the hanging wires emerging from the bottom of the display device. In another embodiment, the clamps provide only a mechanical connection with respect to the hanging wires, which are routed to a central power distribution module where the hanging wires are punctured to draw and distribute power. FIG. 4 illustrates a schematic diagram of power distribution to a display device of the present invention.

Figure 5:
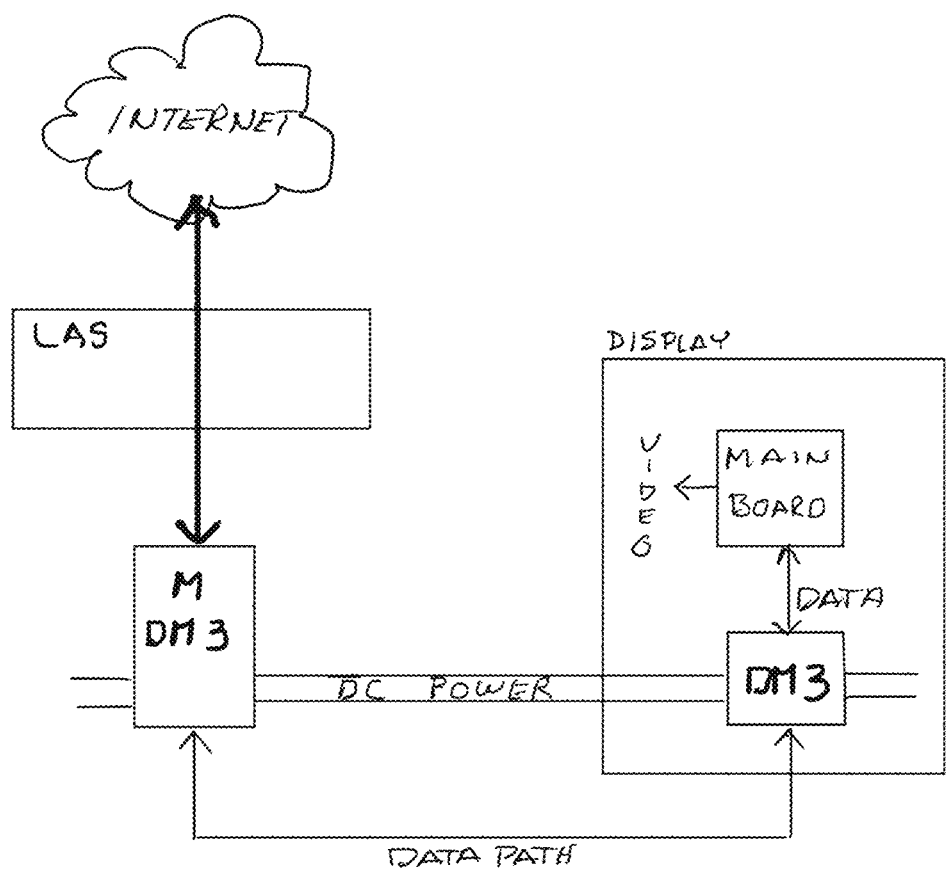
FIG. 5 illustrates a schematic diagram relating to data communication of a display device in a multiple display device installation of the present invention.

Each display device of the present invention may incorporate wireless communication capabilities over standard IEEE 802.11 (WIFI) or BLUETOOTH as secondary communication links. An embedded processor in each display device may operate by connection to the Internet and a service cloud to download visual content, applications, and other data, as well as upload status information. In order to prevent unstable wireless data communication in challenging WIFI environments, each display device may utilize the hanging wires as a wired data communication infrastructure to maintain a connection with the Internet and the service cloud. Data may be carried over DC power using a client data modem and multiplexing module embedded in each display device and connected to the main board through a data interface. The electrical connection created by the display device clamp may also create a data link connection to the master data modem and multiplexing module to input and output data to and from an external data source, such as the Internet, as well as other display devices, either on the same DC power network or Local Access Server. FIG. 5 illustrates a schematic diagram relating to the data communication mechanism of a display device of the present invention.

A direct wireless data link may be established between any of the display devices of the multiple display device installation and/or one or more external devices in a one-to-one or one-to-many configuration. This direct link may be used to permit an external device to send information, including but not limited to ambient light intensity, to a display device of the installation. This direct link may also be used to transmit information, including but not limited to an audio stream, from a display device of the installation to an external device. This direct link may also be used to trigger events based on proximity of a mobile device or application running thereon.

Local Access Server

In the embodiment of the present invention illustrated in FIG. 5, a Local Access Server is provided on the data path between the master data modem and multiplexing module (M-DM3) and the external Internet connection. The external Internet connection may either be connected directly to the master data modem and multiplexing module or to the Local Access Server, such that the Local Access Server would then be connected to the master data modem and multiplexing module over a wired connection. In another embodiment, the configuration may be such as to permit the Local Access Server to connect to the Internet over a wireless connection, e.g., WIFI, 4G/LTE, 5G or other type of wireless connection, such that the Local Access Server would then be connected to the master data modem and multiplexing module over wired connection. The Local Access Server may be physically embedded in the main bar or disposed separately but connected to the main bar via wiring.

The Local Access Server may operate to serve two purposes: providing local media and application storage and sharing a processing load with the display devices. Local display devices are able to obtain media and applications from the Local Access Server faster and more reliably in environments where Internet connection is unreliable or poor in quality. Some applications may also pre-fetch media and applications and store these items on the Local Access Server to speed up certain applications that require fast and reliable content access. Finally, the Local Access Server may store content downloaded locally without ever accessing the Internet for those instances in which content security is a concern.

The Local Access Server may be used in a master-slave configuration for applications such as voice-control or centralized coordination of multiple visual elements. The Local Access Server may also be configured for collaborative computing with respect to processing requirements exceeding the processing capabilities of individual display device processors.

The Local Access Server may incorporate a processing module having communication interfaces and on-board storage. Different types of processing modules may be integrated to emphasize graphics performance, floating points operations, or other types of processing. Communication interfaces may range from standard Ethernet and USB interfaces to high speed, low latency communications for applications requiring high temporal precision. The Local Access Server may also be configured with a cryptographic core or similar hardware component to provide more robust cyber protection to content stored on the Local Access Server.

Additional Aspects

The multiple display device installation of the present invention may be user-controlled via an application running on a processing unit, such as a mobile computing device, including a smartphone or a tablet, or other computing device. The installation may also be user-controlled via other control means, such as voice- or gesture-recognition either through a component of the present invention, e.g., Local Access Server, or through a configured third party device communicating with the installation over a wired or wireless data path.

The multiple display device installation of the present invention may utilize applications designed to operate on a three-tier collaborative processing model made of "remote," "local," and "embedded" processing nodes to deliver a wide range of user experiences. A toolkit may be provided for application developers to use in developing collaborative applications that leverage the resources of one, two, or three node types. At a minimum, user applications must have a component running on the embedded node of each display device affected by the application. The application may (1) be self-contained, i.e., by leveraging the processing resources of a single display device, (2) collaborate horizontally, i.e., by leveraging the processing resources of multiple display devices in a peer-to-peer configuration, (3) collaborate vertically, i.e., by leveraging the processing resources of one or more display devices and the Local Access Server, or (4) collaborate across, i.e., by leveraging the processing resources of one or more display devices, the Local Access Server, and the service cloud. The multiple display devices and Local Access Server topology of the present invention may incorporate an operating framework to facilitate the creation of collaborative applications through abstraction of the multiple nodes and resources into a unified system image where use of node resources is automatically optimized without granular control from the application.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed is:

1. A multiple digital display device installation, comprising:
    multiple digital display devices, each digital display device including a display screen, a memory, and a processor;
    a hanging system configured to physically and electrically connect to the multiple digital display devices, the hanging system comprising a bar and hanging wires extending from the bar to each digital display device of the multiple digital display devices;
    a power adapter connected to the hanging system and configured to convert power received from a power source to direct current power and distribute the direct current power to each digital display device of the multiple digital display devices through the hanging wires; and
    a master data modem and multiplexing module connected to the hanging system and configured to embed an external data signal into the direct current power and distribute data to each digital display device of the multiple digital display devices through the hanging wires.

2. The installation of claim 1, further comprising a local access server connected to at least the master data modem and multiplexing module.

3. The installation of claim 1, wherein each digital display device of the multiple digital display devices further includes a client data modem and multiplexing module configured to communicate with an external data source through the master data modem and multiplexing module.

4. The installation of claim 1, wherein each digital display device of the multiple digital display devices has a thickness of less than 13 mm.

5. The installation of claim 1, wherein the bar is an H-beam.

6. The installation of claim 1, wherein each hanging wire of the hanging wires comprises a protective covering and a conducting core.

7. The installation of claim 6, wherein the protective covering comprises translucent silicon, and wherein the conducting core comprises threaded copper or aluminum.

8. The installation of claim 1, wherein each hanging wire of the hanging wires has a thickness of less than 1 mm.

9. The installation of claim 1, further comprising multiple attachment mechanisms, wherein at least one attachment mechanism of the multiple attachment mechanisms is configured to attach a hanging wire of the hanging wires to a digital display device of the multiple digital display devices.

10. The installation of claim 9, wherein the at least one attachment mechanism includes a vampire tap and a cover cap configured to attach to the vampire tap.

11. A method of installing multiple digital display devices, comprising:
    providing multiple digital display devices, each digital display device including a display screen, a memory, and a processor;
    physically and electrically connecting a hanging system to the multiple digital display devices, the hanging system comprising a bar and hanging wires extending from the bar to each digital display device of the multiple digital display devices;
    connecting a power adapter to the hanging system, wherein the power adapter converts power received from a power source to direct current power and distributes the direct current power to each digital display device of the multiple digital display devices through the hanging wires; and
    connecting a master data modem and multiplexing module to the hanging system, wherein the master data modem and multiplexing module embeds an external data signal into the direct current power and distributes data to each digital display device of the multiple digital display devices through the hanging wires.

12. The method of claim 11, further comprising connecting a local access server to at least the master data modem and multiplexing module.

13. The method of claim 11, wherein each digital display device of the multiple digital display devices further includes a client data modem and multiplexing module configured to communicate with an external data source through the master data modem and multiplexing module.

14. The method of claim 11, wherein each digital display device of the multiple digital display devices has a thickness of less than 13 mm.

15. The method of claim 11, wherein the bar is an H-beam.

16. The method of claim 11, wherein each hanging wire of the hanging wires comprises a protective covering and a conducting core.

17. The method of claim 16, wherein the protective covering comprises translucent silicon, and wherein the conducting core comprises threaded copper or aluminum.

18. The method of claim 11, wherein each hanging wire of the hanging wires has a thickness of less than 1 mm.

19. The method of claim 11, further comprising providing multiple attachment mechanisms, wherein at least one attachment mechanism of the multiple attachment mechanisms attaches a hanging wire of the hanging wires to a digital display device of the multiple digital display devices.

20. The method of claim 19, wherein the at least one attachment mechanism includes a vampire tap and a cover cap configured to attach to the vampire tap.

* * * * *